(12) United States Patent
McWilliams

(10) Patent No.: US 9,701,349 B1
(45) Date of Patent: *Jul. 11, 2017

(54) FLEXIBLE TARPAULIN SUPPORT DEVICE

(71) Applicant: Clifford O. McWilliams, Owasso, OK (US)

(72) Inventor: Clifford O. McWilliams, Owasso, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,081

(22) Filed: Oct. 17, 2016

Related U.S. Application Data

(63) Continuation of application No. 14/696,683, filed on Apr. 27, 2015, now Pat. No. 9,469,353.

(51) Int. Cl.
  B60P 7/02 (2006.01)
  B62D 33/04 (2006.01)
  B60P 7/04 (2006.01)
  B62D 27/02 (2006.01)
  B62D 29/04 (2006.01)
  B60J 7/10 (2006.01)

(52) U.S. Cl.
  CPC ............ B62D 33/044 (2013.01); B60J 7/102 (2013.01); B60P 7/04 (2013.01); B62D 27/02 (2013.01); B62D 29/04 (2013.01)

(58) Field of Classification Search
  CPC .. B62D 33/0604; B62D 27/02; B62D 33/077; B62D 29/04; B62D 33/044; B60J 7/102; B60P 7/04
  USPC ........................................ 296/100.18, 187.09
  See application file for complete search history.

(56) References Cited

U.S. PATENT DOCUMENTS

| | | | |
|---|---|---|---|
| 2,322,424 A | 6/1943 | Deisley |
| 2,565,746 A | 8/1951 | Turner |
| 2,683,265 A | 7/1954 | Wayne |
| 2,955,874 A | 10/1960 | Brindley |
| 3,226,153 A | 12/1965 | Haid |
| 3,894,766 A | 7/1975 | Woodward |
| 4,248,475 A | 2/1981 | Johnsen |
| 5,100,549 A | 3/1992 | Langerak et al. |
| 5,102,182 A | 4/1992 | Haddad, Jr. |

(Continued)

FOREIGN PATENT DOCUMENTS

DE 3812506 3/1988

OTHER PUBLICATIONS

El Cheapo Tarp Bows, Feather Craft Forum; http://729.activeboard.com/t37303339/el-cheapo-tarp-bows/, Apr. 2014.

(Continued)

*Primary Examiner* — Joseph D Pape
*Assistant Examiner* — Dana Ivey
(74) *Attorney, Agent, or Firm* — Head, Johnson, Kachigian & Wilkinson, PC

(57) ABSTRACT

A tarpaulin support device for an open top of a trailer or vehicle. The device has a flexible and resilient tube assembly bowed from a normally straight position under tension to an arched position outwardly from the trailer or vehicle. The tube assembly may be removably mounted to the side walls of the trailer or vehicle via brackets with angled bores therethrough. The tube assembly comprises an outer tube, an inner tube located substantially within an outer tube, a rod located substantially within an outer tube, or a rod located substantially within an inner tube located substantially within an outer tube.

6 Claims, 4 Drawing Sheets

(56) References Cited

U.S. PATENT DOCUMENTS

| | | | |
|---|---|---|---|
| 5,288,123 | A | 2/1994 | Dimmer |
| 5,429,408 | A | 7/1995 | Henning et al. |
| 5,664,824 | A | 9/1997 | Stephens et al. |
| 5,873,210 | A | 2/1999 | Brumleve |
| D413,560 | S | 9/1999 | Sambell |
| 6,139,085 | A | 10/2000 | Templin et al. |
| 6,481,779 | B1 | 11/2002 | Gothier et al. |
| 7,472,666 | B1 | 1/2009 | Richard et al. |
| 7,661,750 | B2 | 2/2010 | Liedmeyer et al. |
| 8,303,017 | B2 | 11/2012 | LeBlanc et al. |
| D679,771 | S | 4/2013 | Muggleton |
| 8,579,353 | B1 | 11/2013 | Aulick |
| D761,713 | S | 7/2016 | Hensley |
| 9,469,353 | B1 * | 10/2016 | McWilliams ........ B62D 33/044 |
| 2007/0035153 | A1 | 2/2007 | Henning |
| 2008/0012378 | A1 | 1/2008 | LeBlanc et al. |
| 2008/0290686 | A1 | 11/2008 | Royer |
| 2009/0121514 | A1 | 5/2009 | Remmel et al. |
| 2011/0254310 | A1 | 10/2011 | Royer |
| 2012/0085380 | A1 | 4/2012 | Buckley |

OTHER PUBLICATIONS

Covering the Tanzer 22 for the Winter using PVC Conduit and a tarp; http://www.christinedemerchant.com/tanzer_winter-cover.html; Apr. 2014.
Tarp Support Bows, Bantam Trailer Blog; http://boyink.com/bantam/tarp-support-bows/; Boyink, Apr. 2014.

* cited by examiner

FLEXIBLE TARPAULIN SUPPORT DEVICE

CROSS REFERENCE

This is a continuation of and claims priority to U.S. patent application Ser. No. 14/696,683 filed Apr. 27, 2015.

BACKGROUND OF THE INVENTION

Field of the Invention

This invention relates generally to a tarpaulin support device for semi-trailers, and more particularly, but not by way of limitation, to a tarp bow that is flexible and has more than one layer.

Description of the Related Art

As noted in Stephens et al., U.S. Pat. No. 5,664,824, incorporated by reference herein, tractor trailers used to haul loose material, such as sand and gravel, will often employ a tarpaulin cover over the open top of the trailer having a bottom and a pair of opposed side walls. The tarpaulin discourages any of the loose material from falling or being blown off during transportation. A series of curved bows extending laterally across the open top form a support for the tarpaulin. Use of a tarpaulin which is arched at the center provides a number of advantages. Rainwater will run off of the load more easily. Additionally, the arched center accommodates high loads. In the case of sand and gravel, loading of these materials is often preceded by removal of the bows in order to avoid damage. Loading of these materials through the open top will often dent, twit, and break the support bows.

Stephens et al. solves this problem by making the bow flexible. Specifically, Stephens et al. teaches a tarpaulin support device for an open top of a trailer, vehicle, or the like, where the device includes a flexible and resilient pole made of nylon composite which, although sturdy, is both flexible and resilient. The pole is normally straight but, when installed, bows outwardly away from the floor of the trailer. The pole will flex and deflect if sand, gravel, or other materials impact the pole during loading operations or in the event of impact from an end loader or other loading equipment used during the loading operation. Thus, the pole may be kept in place during loading of the trailer.

The pole of Stephens et al. is mounted to the trailer via opposing brackets, where each bracket is attached to the trailer and each has a non-cylindrical opening therein. A first socket and a second socket each have a receptacle to receive one of the pole ends, each socket terminating in a non-cylindrical post receivable in one of the openings to retain the sockets and retain the pole and to prevent radial movement of the pole.

Despite its many advantages, there are certain drawbacks to the Stephens et al. device. Notably, the nylon of the pole tends to become rough through use, causing the tarpaulin to wear and eventually tear. Additionally, the nylon tends to crack in both cold and heat. The nylon pole can be costly to replace, particularly considering the fact that a single trailer requires multiple poles. Another drawback of the Stephens et al. device is that, over time, it tends to cause the walls of the trailer to deflect outward.

Based on the foregoing, it is desirable to provide a flexible bow that provides the advantage of the Stephens et al. pole without the drawbacks stated above.

SUMMARY OF THE INVENTION

In general, in a first aspect, the invention relates to a tarpaulin support device for an open top of a trailer or vehicle, the device comprising a flexible and resilient tube assembly having a first end and a second end. The tube assembly is normally straight but is bowed under tension to an arched position outwardly from the trailer or vehicle. The tarpaulin support device may further comprise a first bracket and a second opposed bracket, each bracket attached to the trailer or vehicle and having a bore therethrough to receive either the first end or the second end of the tube assembly to retain the tube assembly in the arched position. Each bore may extend at an upward angle from the trailer or vehicle, thus facilitating the arched position of the tube assembly outwardly from the trailer or vehicle. The tube assembly may comprise an outer tube, an inner tube located substantially within an outer tube, a rod located substantially within an outer tube, or a rod located substantially within an inner tube located substantially within an outer tube. The outer tube may be made of PVC; the inner tube, if present, may be made of PVC; and the rod, if present, may be made of nylon composite or other non-metallic material. The outer tube may be freeze resistant, UV resistant, or both freeze resistant and UV resistant. The outer tube may be longer than the inner tube and/or the rod, if present.

In a second aspect, the invention relates to a tarpaulin support device for a trailer or vehicle having a bottom, an open top, a first side wall, and a second opposed side wall, the device comprising a flexible and resilient tube assembly having a first end and a second end, the tube assembly bowed from a normally straight position under tension to an arched position outwardly from the trailer or vehicle. The device further comprises a first bracket attached to the first side wall, where the first bracket has a bore therethrough in which the first end of the tube assembly is receivable, and a second bracket attached to the second side wall, where the second bracket has a bore therethrough in which the second end of the tube assembly is receivable, such that the brackets allow axial movement of the tube assembly in the bores to retain the tube assembly in the arched position. Each bore may extend at an upward angle from the side wall, thus facilitating the arched position of the tube assembly outwardly from the trailer or vehicle. The tube assembly may comprise an outer tube, an inner tube located substantially within an outer tube, a rod located substantially within an outer tube, or a rod located substantially within an inner tube located substantially within an outer tube. The outer tube may be longer than the inner tube and/or the rod, if present.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
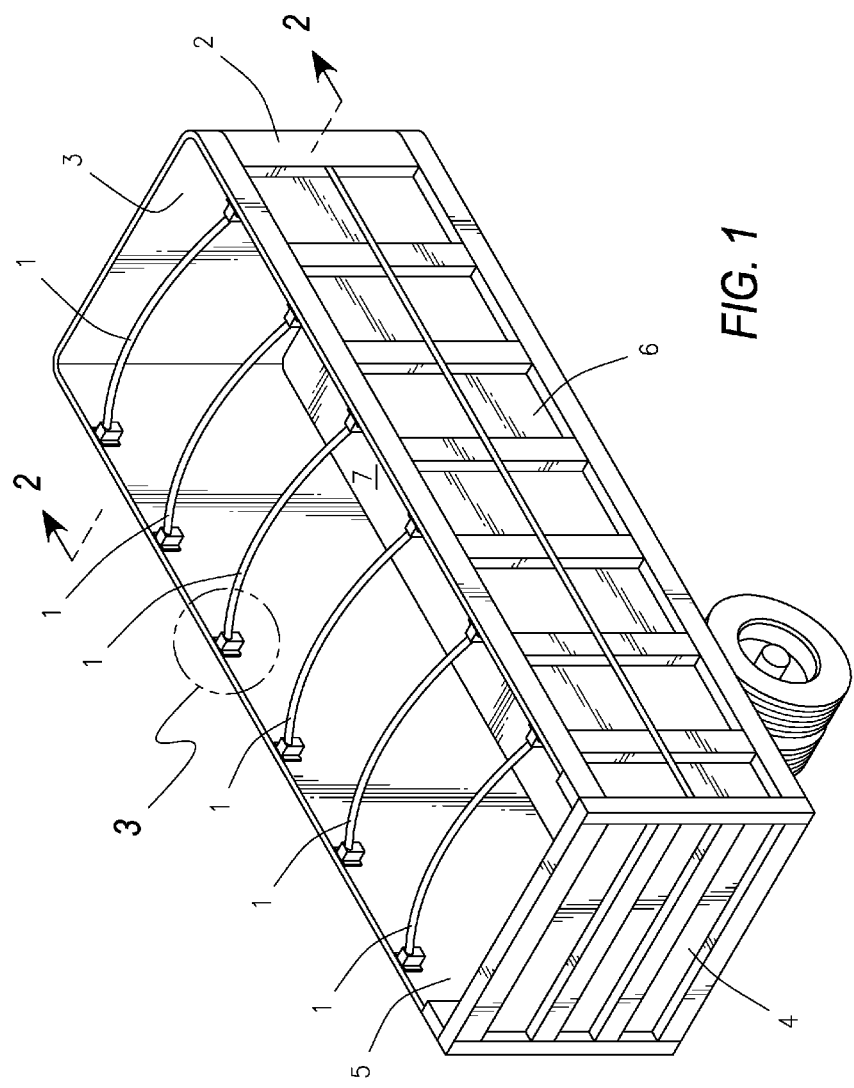
FIG. 1 is a perspective view of a semi-trailer with multiple flexible tarpaulin support devices installed thereon.

In general, in a first aspect, the invention relates to a tarpaulin support device 1, as shown in the Figures. As seen in FIG. 1, one or more of the tarpaulin support devices 1 may be used on a semi-trailer 2 or other vehicle. The trailer 2 may include a front end wall 3; an opposed rear end 4 which may include a removable or swinging gate that may be closed during loading and transportation and open for unloading; a pair of opposed side walls 5 and 6; and a floor 7. The trailer 2 may have an open top, which may be covered by a tarpaulin after the trailer 2 has been loaded with sand, gravel, or other material to discourage any of the loose material from falling or being blown off during transportation.

Figure 2:
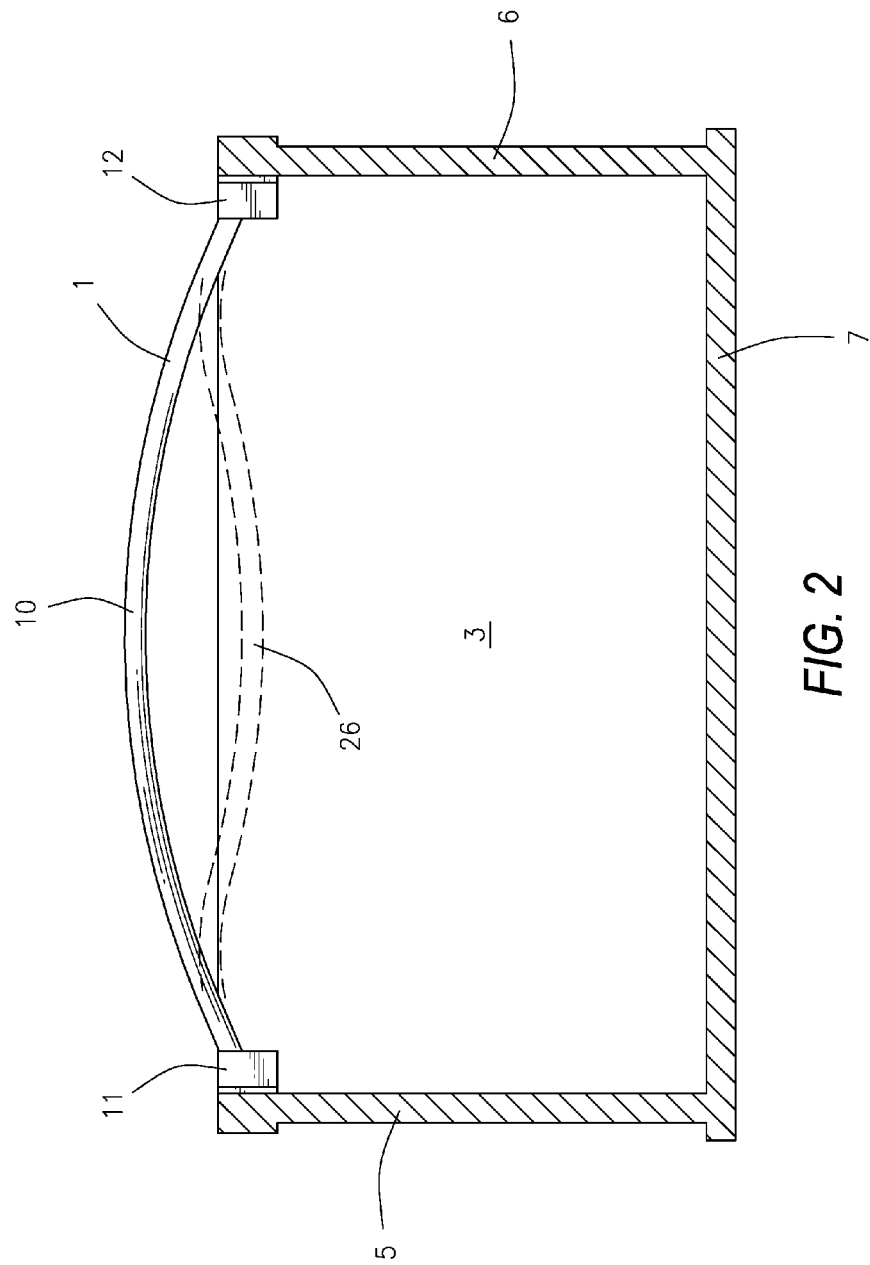
FIG. 2 is a sectional view taken along section line 2-2.

Each tarpaulin support device 1 may comprise a tube assembly 10 extending laterally across the open top, as seen in FIGS. 1 and 2. The tube assembly 10 may have a circular cross section, or any other desired cross section, with a hollow center. The tube assembly 10 may be normally straight. When installed, the tube assembly 10 may be bowed outwardly away from the floor 7 of the trailer 2. By exerting force, the tube assembly 10 may be moved from its normally straight condition to the arched position for use; when the force is released, the tube assembly 10 may return to its straight condition.

Figure 3:
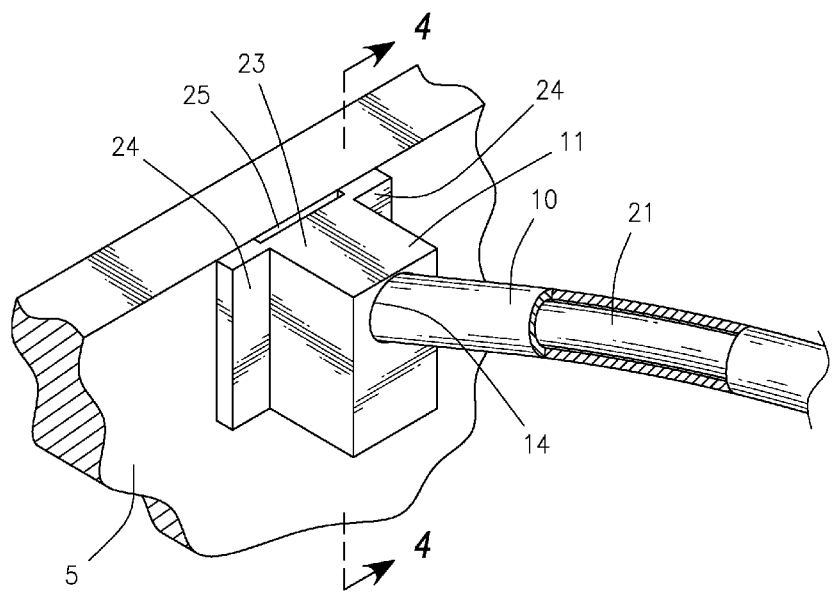
FIG. 3 is a partial, cutaway view of the flexible tarpaulin support device.
Figure 4:
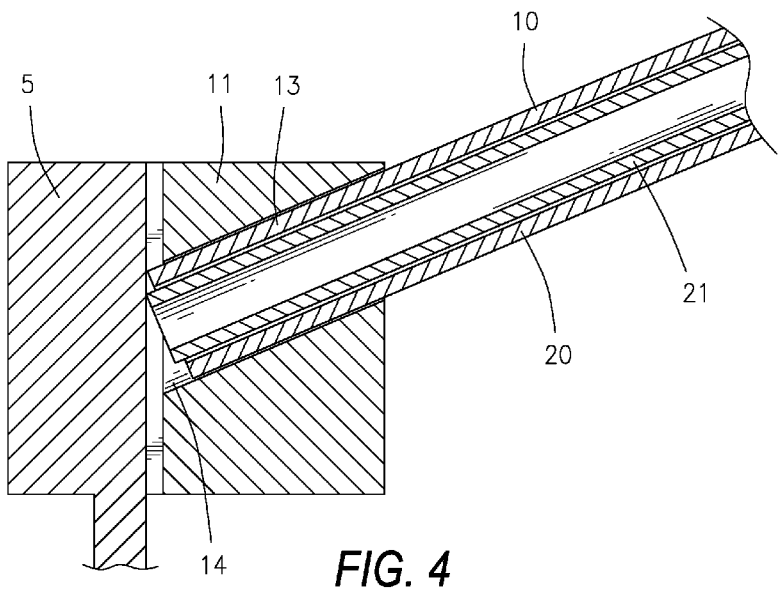
FIG. 4 is a sectional view taken along section line 4-4, where the flexible tarpaulin support device has a two-tube configuration.

As seen in FIGS. 3 and 4, the tarpaulin support device 1 may further comprise a first bracket 11 and a second bracket 12, where the tube assembly 10 has two opposing ends 13 and where one of the ends 13 is receivable in the first bracket 11 and the other end 13 is receivable in the second bracket 12. Specifically, each bracket 11 and 12 may have a cylindrical bore 14 therethrough to receive the ends 13 of the tube assembly 10. It will be understood that other non-cylindrical configurations of the tube assembly 10 and bore 14 might be employed with the same results.

The tube assembly 10 may not be permanently affixed in the brackets 11 and 12. To insert, ends 13 the tube assembly 10 may be moved axially into the bores 14 of the brackets 11 and 12.

Figure 5:
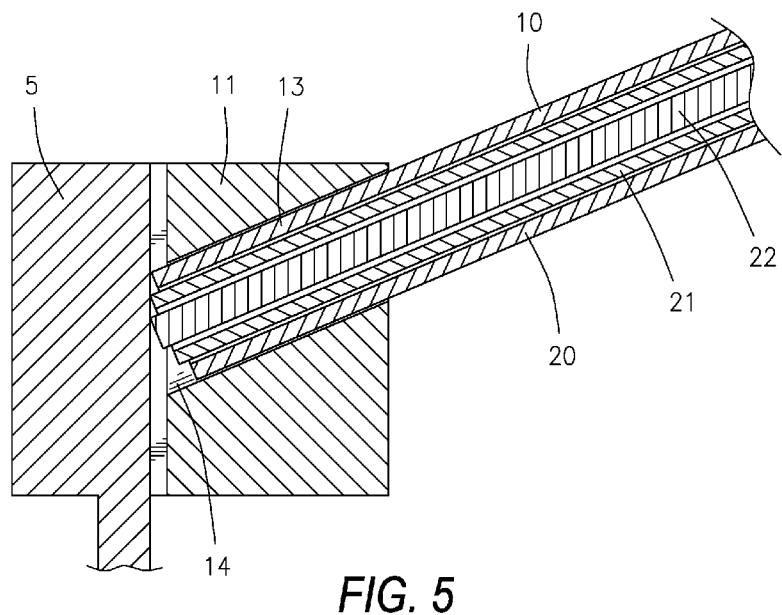
FIG. 5 is a sectional view of the flexible tarpaulin support device with a two-tube-plus-rod configuration.
Figure 6:
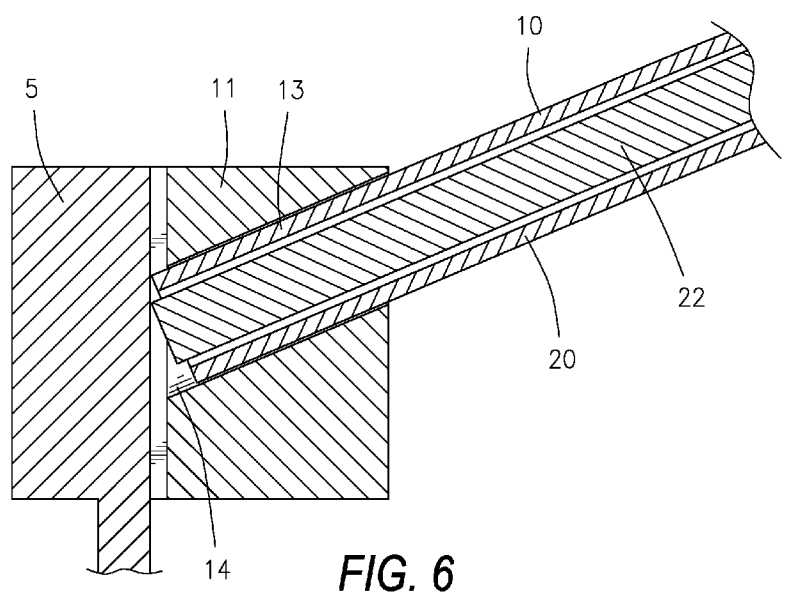
FIG. 6 is a sectional view of the flexible tarpaulin support device with a tube-plus-rod configuration.

Each of the first brackets 11 may be attached to the side wall 5 of the trailer 2, while each of the second brackets 12 may be attached to the side wall 6 of the trailer 2. The brackets 11 and 12 may be welded or otherwise secured to the side walls 5 and 6. Each of the brackets 11 and 12 may be arranged so that its bore 14 angles downward toward the side wall 5 or 6 to which the bracket 11 or 12 is attached, as seen in FIGS. 4 through 6, facilitating the upward arch of the tube assembly 10. When multiple tarpaulin support devices 1 are used on a trailer 2, the bores 14 of each of the first brackets 11 may be parallel to each other, while the bores 14 of each of the second brackets 12 may be parallel to each other.

The tube assembly 10 may comprise one or more one or more substantially concentric tubes, which may or may not surround a rod. For example, the tube assembly 10 may comprise an outer tube 20 surrounding an inner tube 21, as seen in FIG. 4. As seen in FIG. 5, the tube assembly 10 may comprise an outer tube 20 surrounding an inner tube 21, which in turn surrounds a rod 22. FIG. 6 shows the tube assembly 10 comprising an outer tube 20 surrounding a rod 22. Any number of tubes, with or without a rod, may be included in the tube assembly and remain within the scope of the invention. The inner tube 21, if present, may have a smaller outer diameter than the inner diameter of the outer tube 20. Likewise, the rod 22, if present may have a smaller diameter than the inner diameter of the outer tube 20. If both the rod 22 and the inner tube 21 are present, the rod 22 may have a smaller diameter than the inner diameter of the inner tube 21.

The length of the tube assembly 10 may be longer than the distance between the first bracket 11 and the second bracket 12 as installed or, alternately stated, longer than the distance between side wall 5 and side wall 6 at the location at which the brackets 11 and 12 are or will be installed. Accordingly, the tube assembly 10 may be under tension when bowed. If an inner tube 21 or a rod 22 is included in the tube assembly 10, it may optionally be shorter than the outer tube 20. This is because the arch of the inner tube 21 and/or rod 22 may be different than that of the outer tube 20 due to their concentric nature, which causes the inner tube 21 and/or rod 22 to protrude from the ends of the outer tube 20 when arched if they are the same length. The inner tube 21 and/or rod 22 may be completely or substantially completely interior to the outer tube 21, such that the inner tube 21 and/or rod 22 is completely or substantially completely covered by the outer tube 21. The inner tube 21 and/or rod 22 may substantially the same length as the outer tube 21, such that the tube assembly 10 may have multiple layers at all points along its length. The outer tube 20, inner tube 21 if present, rod 22 if present, and any additional tubes if present may all be concentric when in their straight condition.

The outer tube 20, as well as inner tube 21 and any additional tubes, if they are present, may be made of PVC pipe which, although sturdy, is both flexible and resilient. In particular, the tubes may be made of Schedule 80 PVC, which is freeze-resistant. The outer tube 20 may be made of UV-resistant material or, additionally or alternately, may be coated in a UV-resistant coating. The rod 22, if it is present, may be made of nylon or other non-metallic material. The rod 22 may likewise be sturdy, flexible, and resilient.

Brackets 11 and 12 may comprise a body 23 with the bore 14 extending therethrough and one or more legs 24 extending from the body 23. The body 23 may attach to side wall 5 or 6 via the legs 24. The legs 24 may be spaced such that a gap 25 is formed between the side wall 5 or 6 and at least a portion of the body 23, as shown in FIG. 3. The gap 25 may be located adjacent the bore 14 such that the tube assembly 10 may extend through the bore 14 and terminate at least partially in the gap 25, as shown in FIGS. 4, 5, and 6.

It has been found that the tarpaulin support device 1 and, in particular, the tube assembly 10 will flex and deflect if sand, gravel, or other materials impact the tube assembly 10 during the loading operation. The tube assembly 10 may also flex and deflect in the event of impact from an end loader or other loading equipment used during the loading operation. Such deflection is shown in dashed lines 26 on FIG. 2.

The outer tube 20 may protect the inner tube 21 and/or rod 22 from damage, wear, UV exposure, color fading, etc., as well as insulating the inner tube 21 and/or rod 22 from extreme temperatures. The nylon pole of Stephens et al. is prone to cracking when exposed to UV radiation and cannot withstand freezing temperatures. Thus, it must be removed when temperatures drop too low and must be replaced regularly. Furthermore, the nylon tends to get rough with use, causing wear in the tarp. In the present invention, the nylon rod 22 may not need to be replaced as often due to the protection offered by the outer tube 20. When the outer tube 20 becomes worn or damaged, it may be replaced without replacing the inner tube 21 and/or rod 22. This may reduce the cost of use of the flexible support device over that of Stephens et al. The initial cost may likewise be lower due to the fact that less nylon may be used in the present invention. The brackets of the present invention may offer similar savings over Stephens et al. as they are simpler due to the fact that no socket is needed to prevent the tube assembly 10 from rotating, unlike the pole of Stephens et al. Finally, it has been found that the tarpaulin support device 1 does not cause the walls of the trailer 2 to deform in the way the Stephens et al. device does.

Whereas, the devices and methods have been described in relation to the drawings and claims, it should be understood that other and further modifications, apart from those shown or suggested herein, may be made within the spirit and scope of this invention.

What is claimed is:

1. A tarpaulin support device for an open top of a trailer or vehicle, the device comprising:
    a flexible and resilient tube assembly having a first end and a second end, where the tube assembly comprises an outer tube and:
        an inner tube located substantially within the outer tube, where the outer tube is at least as long as the inner tube and where the outer tube and the inner tube are substantially concentric;
        a rod located substantially within the outer tube, where the outer tube is at least as long as the rod and the outer tube and the rod are substantially concentric; or
        a rod located substantially within an inner tube located substantially within the outer tube, where the outer tube is at least as long as inner tube and the rod and where the outer tube, the inner tube, and the rod are substantially concentric; and
    a first bracket and a second opposed bracket, each bracket attached to the trailer or vehicle and having a bore extending at least partially therethrough to receive either the first end or the second end of the tube assembly to retain the tube assembly in an arched position.

2. The tarpaulin support device of claim 1 where each bore extends at an upward angle from the trailer or vehicle, thus facilitating the arched position of the tube assembly outwardly from the trailer or vehicle.

3. The tarpaulin support device of claim 1 where the outer tube is made of PVC; the inner tube, if present, is made of PVC; and the rod, if present, is made of nylon composite or other non-metallic material.

4. The tarpaulin support device of claim 1 where the outer tube is freeze resistant, UV resistant, or both freeze resistant and UV resistant.

5. A tarpaulin support device for a trailer or vehicle having a bottom, an open top, a first side wall, and a second opposed side wall, the device comprising:
    a flexible and resilient tube assembly having a first end and a second end, where the tube assembly comprises an outer tube and:
        an inner tube located substantially within the outer tube, where the outer tube is at least as long as the inner tube and where the outer tube and the inner tube are substantially concentric;
        a rod located substantially within the outer tube, where the outer tube is at least as long as the rod and the outer tube and the rod are substantially concentric; or
        a rod located substantially within an inner tube located substantially within the outer tube, where the outer tube is at least as long as inner tube and the rod and where the outer tube, the inner tube, and the rod are substantially concentric,
    where the tube assembly is capable of being arched;
    a first bracket attached to the first side wall, where the first bracket has a bore extending at least partially therethrough in which the first end of the tube assembly is receivable; and
    a second bracket attached to the second side wall, where the second bracket has a bore extending at least partially therethrough in which the second end of the tube assembly is receivable,
such that the brackets allow axial movement of the tube assembly in the bores to retain the tube assembly in an arched position.

6. The tarpaulin support device of claim 5 where each bore extends at an upward angle from the side wall, thus facilitating the arched position of the tube assembly outwardly from the trailer or vehicle.

* * * * *